Dec. 22, 1964  C. H. DAVIDSON ETAL  3,162,470
QUICK DISCONNECT HIGH PRESSURE COUPLING
Filed May 23, 1961  2 Sheets-Sheet 2
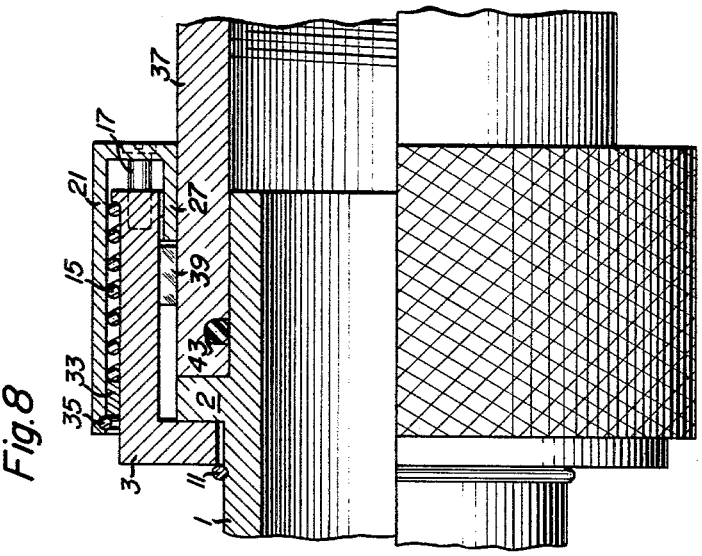
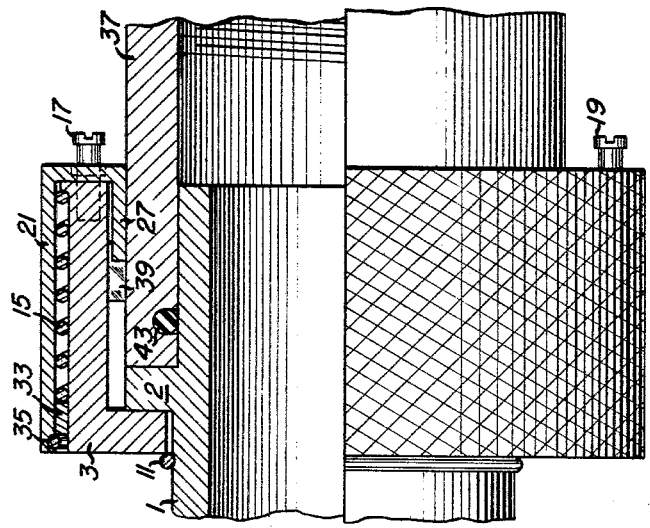
INVENTORS
Charlie H. Davidson
Franklin Owens
BY George Renehan
ATTORNEY United States Patent Office 3,162,470
Patented Dec. 22, 1964

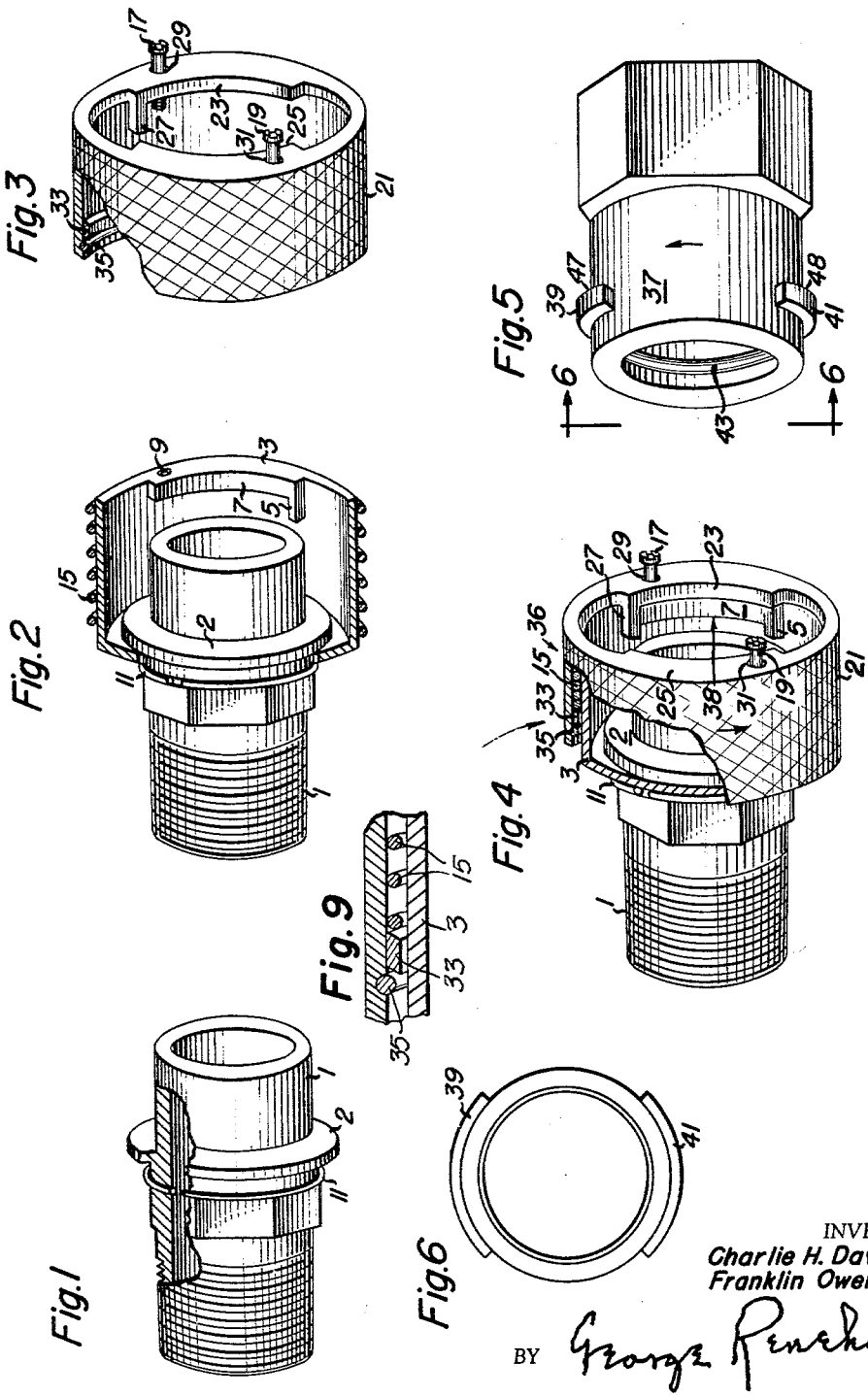

3,162,470
QUICK DISCONNECT HIGH PRESSURE COUPLING
Charlie H. Davidson, Edgewood, and Franklin Owens, Towson, Md., assignors to the United States of America as represented by the Secretary of the Army
Filed May 23, 1961, Ser. No. 112,130
2 Claims. (Cl. 285—86)
(Granted under Title 35, U.S. Code (1952), sec. 266)

The invention described herein may be manufactured and used by or for the Government of the United States of America for governmental purposes without the payment to us of any royalty thereon.

The invention relates to quick disconnecting high pressure couplings and more particularly to the class of couplings of this character in which the co-operating members thereof are assembled in a unique manner so as to permit an easy and quick connection and disconnection of said members.

The primary object of the invention is the provision of a coupling of this character wherein the improved features thereof are capable of assuring positive locking and a fluid-tight joint in a high pressure line.

Another object of the invention is the provision of a coupling of this character in which the related members may be easily attached or detached from each other by a simple pulling and turning action. When connected or coupled the members will render the said coupling water and pressure tight.

A further object of the invention is the provision of a coupling of this character which is very simple in construction, throughly reliable and efficient in its purpose, readily and easily coupled and uncoupled, and also which is inexpensive to manufacture.

Other objects and advantages will appear in the following specification, and the novel features of the invention will be particularly pointed out in the appended claims.

The invention will be best understood by reference to the accompanying drawings forming a part of this specification, and in which:

FIGURE 1 is a partially sectionalized perspective view of a male body member.

FIGURE 2 is a perspective view of the male body member and a sectional view of a locking ring member in an assembled position.

FIGURE 3 is a partially sectionalized perspective view of the locking ring member.

FIGURE 4 is a partially sectionalized perspective view of the assembled coupling.

FIGURE 5 is a perspective view of a male connector member.

FIGURE 6 is an end view of the male connector member.

FIGURE 7 is a partially sectionalized assembled coupling in locked position.

FIGURE 8 is a partially sectionalized assembled coupling in unlocked position.

FIGURE 9 is a fragmentary enlarged view showing the details of the spring retainers.

Referring to the drawings in detail, the device consists of a male body member 1 having annular flange 2. Surrounding said male body member 1 there is a lock ring member 3. Said lock ring member having interiorly located a pair of lugs and a pair of ledges of which only one of each, 5 and 7 respectively is shown. In each of the ledges 7 there is a threaded hole 9, of which also only one is shown. The lock ring 3 is held in place by a snap ring 11 and the said annular flange 2. The engagement of said lock ring 3 and said male body 1 is such that in operation, both are permitted to freely swivel about one-another. Surrounding the lock ring 3, there is a coil spring 15 over which is assembled and secured with retaining screws 17 and 19, a knurled safety ring member 21. Said safety ring member has ledges 23 and 25 and a set of lugs, only one of which, 27 is shown. The ledges 23 and 25 have clearance holes 29 and 31 drilled through them. The retaining screws permit longitudinal movement but serve to prevent rotation of the safety ring member 21, relative to locking ring member 3. The coil spring 15 is held in place by a spring retainer 33 and a second snap ring 35. This completes the first half or the first sub-assembly of the coupling, shown at 36.

When the operator holds the safety ring member 21 and the male memeber 1 and pulls them apart, the safety will slide outward until it is stopped by the heads of the retaining screws 17 and 19. Releasing the safety ring at this limit point, will by the influence of the coil spring 15 retract the said safety ring 21 back to its normally closed position, creating a cradle which is generally shown at 38 and is bounded by elements 5, 7, and 27 to engage surface 47 of a male connector member which will be later described. It is to be understood that there is a similar set of elements on the opposite side of the coupling.

The male connector member 37 shown in FIG. 5 has key lugs 39 and 41, both having engaging surfaces 47 and 48. The lugs are so constructed and located that when the male connector is inserted into the opening of said sub-assembly 36, they will match the latter's contours in a similar fashion to an ordinary lock and key and slip into the above mentioned cradles of the sub-assembly 36 when the male connector is rotated.

The function of above mentioned cradle is illustrated by FIGS. 7 and 8. In FIG. 7, the key lug 39 is shown locked in position behind the lug 27. In FIG. 8, the lug 39 is shown free to rotate a quarter turn so that the male connector 37 can be withdrawn or disconnected. This occurs only when the safety ring 21 is moved to the right as far as it will go. This action can be further illustrated by FIG. 4. It is obvious from this figure that when lug 27 is moved to the right along with the safety ring 21, the lug 27 will no longer project axially beyond the ledge 7 but will be flush with radial surface of ledge 7.

The male connector member 37 being normally attached to an end of a hose in the line, is inserted into the above described sub-assembly 36, which is usually attached to the other end of another hose of the said line. The operator, firmly grasping in one hand the safety ring member 21 of the sub-assembly 36, pushes with the other hand inwardly into the opening of said sub-assembly 36 the male connector member 37 until the end of same makes contact with the annular flange 2 of the male body member 1 as shown in FIG. 7. Upon pushing the male connector 37 including the male body 1 further inwardly, this movement will be stopped by the heads of the retaining screws 17 and 19 as shown in FIG. 8. The interior of the male connector 37 now surrounding the male body 1, is sealed with the latter by or through the means of O-ring 43. While retaining this steady inward pushing force on the male connector 37, the operator then turns it clockwise. This action will by way of the key lugs 39 and 41 engage through the surfaces 47 and 48 and snap-fit into the cradle 38 and the similar cradle at the opposite side (not shown) thus completely locking and uniting both units. The operator releases the safety ring member 21 which now has attained the position of FIGS. 4 and 7. The unit now constitutes a lock-tight connection in a high pressure line which now is ready to be used as desired.

To disconnect the coupling, the operator first fully pushes in the male connector member 37. This pushing force enables the lugs 39 and 41 of same to clear the lug 27 and similar lug on the opposite side (not shown) of the safety ring member 21. Again here, the operator maintaining constant pushing force on the male connector 37 turns same quarter turn counterclockwise. This action will disengage the lugs 39 and 41 from the cradle 38 and the similar cradle on the opposite side (not shown), thus leaving the male connector 37 free to be completely pulled out.

It is believed that this coupling which is assembled in a unique manner so as to permit the easy and quick connection of the members of the coupling or the detachment of the same from each other, will also provide complete safety, since in order to disconnect this unit, two different movements, first pulling, then rotating are required. When locked, two portions of the lines (one containing the sub-assembly 36, and the other, the male connector member 37) are free to swivel relative to each other. A pressure-tight seal is provided by the rubber "O" ring.

The instant coupling has been made of aluminum alloy and has been used at an operating pressure of 300–400 p.s.i. It has been tested and found to be satisfactory at 2000 p.s.i. It is obvious that this range could be extended by the use of high strength alloy steels where weight is not the prime consideration.

Though we have shown and described a particular construction, combination and arrangement of parts and portions, and a certain modification thereof, we do not wish to be limited to this particular construction, combination and arrangement, nor to the modification, but desire to include in the scope of our invention the construction, combination and arrangement substantially as set forth in the appended claims.

Having thus described our invention, what we claim as new and desire to secure by Letters Patent is:

1. In a quick disconnect high pressure coupling, the combination comprising:
   (a) a cylindrical male body member having a flange thereon located adjacent one end thereof,
   (b) a cylindrical lock ring member rotatably mounted between said flange and the remote end of said body member and extending axially around the adjacent end,
      (1) said lock ring member having a diametrically opposed pair of inner ledges at said adjacent end thereof which extend circumferentially a predetermined distance and a diametrically opposed pair of lugs which extend axially a predetermined distance on one end of said ledges,
      (2) said lock ring member having a predetermined radial opening on said adjacent end thereof,
   (c) a cylindrical safety ring member extending axially around said lock ring member,
      (1) said safety ring member being slideably secured to said lock ring member by means of a plurality of retaining screws mounted on the adjacent end of said lock ring,
      (2) said safety ring member having a diametrically opposed inner pair of axially extending lugs on said adjacent end thereof which are positioned adjacent the opposite end of said lock ring ledges from said lock ring lugs and which extend the same axial distance as said lock ring lugs,
      (3) said safety ring member having a radial opening on said adjacent end which is congruous with said lock ring member,
   (d) spring means located on the exterior of said lock ring member and on the interior of said safety ring member whereby said safety ring member is biased toward the remote end of said male body member,
   (e) a cylindrical male connector having a remote end and an adjacent end and an internal "O" ring seal on said adjacent end thereof adapted to fit on said adjacent end of said male body member,
      (1) said male connector having an external pair of circumferentially extending, diametrically opposed key lugs on said adjacent end thereof adapted to engage and lock between the lugs of said lock ring member and safety ring member after passing through said predetermined opening of said lock ring member and said safety ring member.

2. In a quick disconnect high pressure coupling, the combination comprising:
   (a) a cylindrical male body member having securing means thereon adjacent one end,
   (b) a cylindrical lock ring member rotatably mounted between said securing means and the remote end of said body member and extending axially around the adjacent end,
      (1) said lock ring member having a diametrically opposed inner pair of first locking means at said adjacent end thereof which extend circumferentially a predetermined distance and a diametrically opposed pair of second locking means which extend axially a predetermined distance on one end of said first means,
      (2) said lock ring member having a predetermined radial opening on said adjacent end thereof,
   (c) a cylindrical safety ring member extending axially around said lock ring member,
      (1) said safety ring member being slideably secured to said lock ring member by securing means mounted on said lock ring,
      (2) said safety ring member having a diametrically opposed inner pair of axially extending third locking means on said adjacent end thereof positioned adjacent the opposite end of said first locking means and extending the same axial distance as said second locking means,
      (3) said safety ring member having an opening on said adjacent end which is congruous with said lock ring member,
   (d) spring means located between said lock ring member and said safety ring member whereby said safety ring member is biased toward the remote end of said male body member,
   (e) a cylindrical male connector having a remote end and an adjacent end,
      (1) said connector having internal sealing means on said adjacent end adapted to fit on said adjacent end of said body member,
      (2) said connector having an external pair of circumferentially extending, diametrically opposed fourth locking means on said adjacent end adapted to engage and lock between said second and third locking means after passing through the radial openings of said lock ring member and safety ring member.

References Cited by the Examiner

UNITED STATES PATENTS

| | | | |
|---|---|---|---|
| 980,677 | 1/11 | Rhoads | 285—86 |
| 1,148,824 | 8/15 | Boje | 285—377 |
| 1,871,370 | 8/32 | Jacques | 285—361 |
| 1,885,321 | 11/32 | Benn | 285—361 |
| 1,899,119 | 2/33 | Singer | 285—360 X |
| 2,305,841 | 12/42 | Carlson | 285—377 |
| 2,804,319 | 8/57 | Weber | 285—316 |

CARL W. TOMLIN, *Primary Examiner.*